INVENTOR.
CARL THUMIM
BY
OSTROLENK, FABER, GERB & SOFFEN
ATTORNEYS

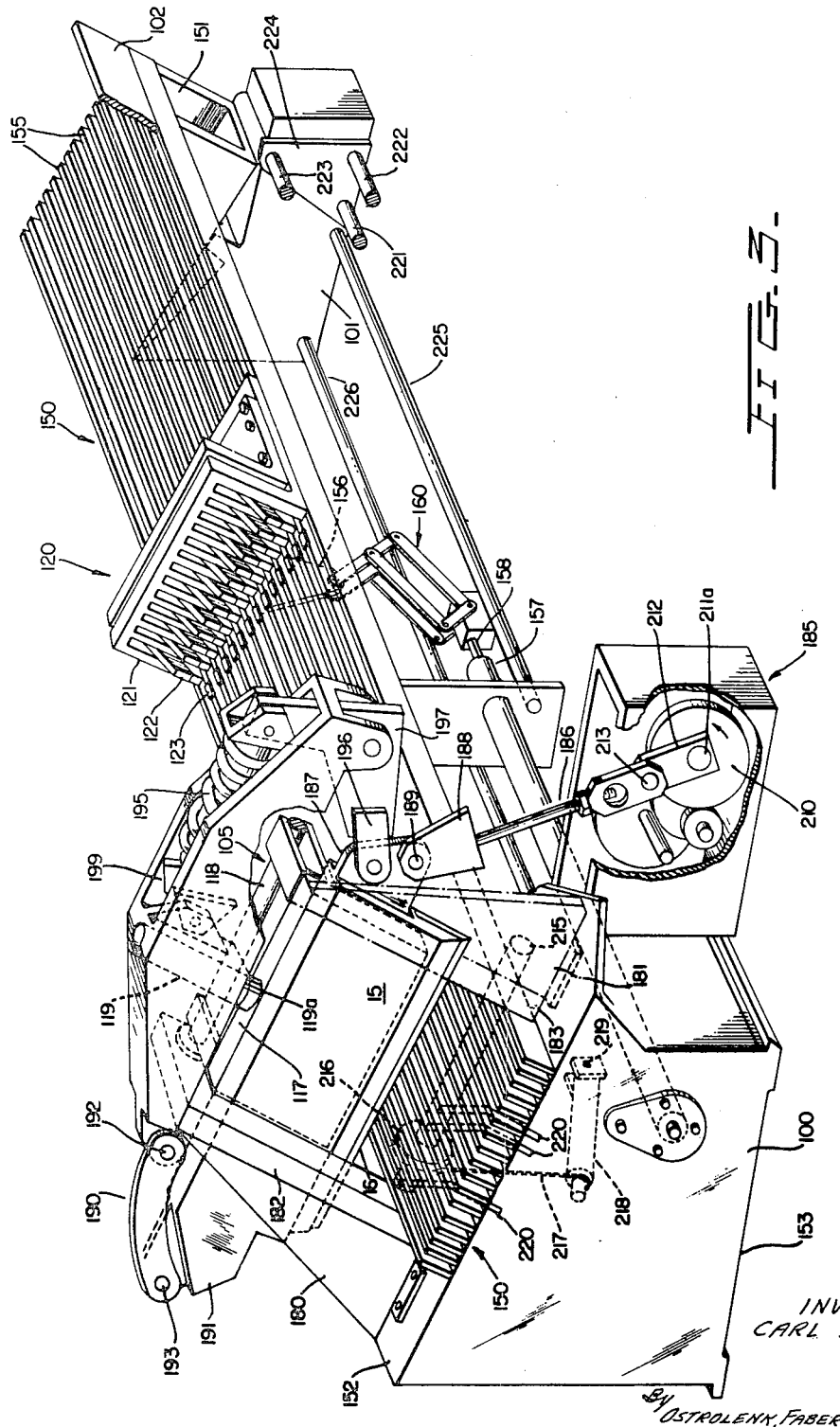

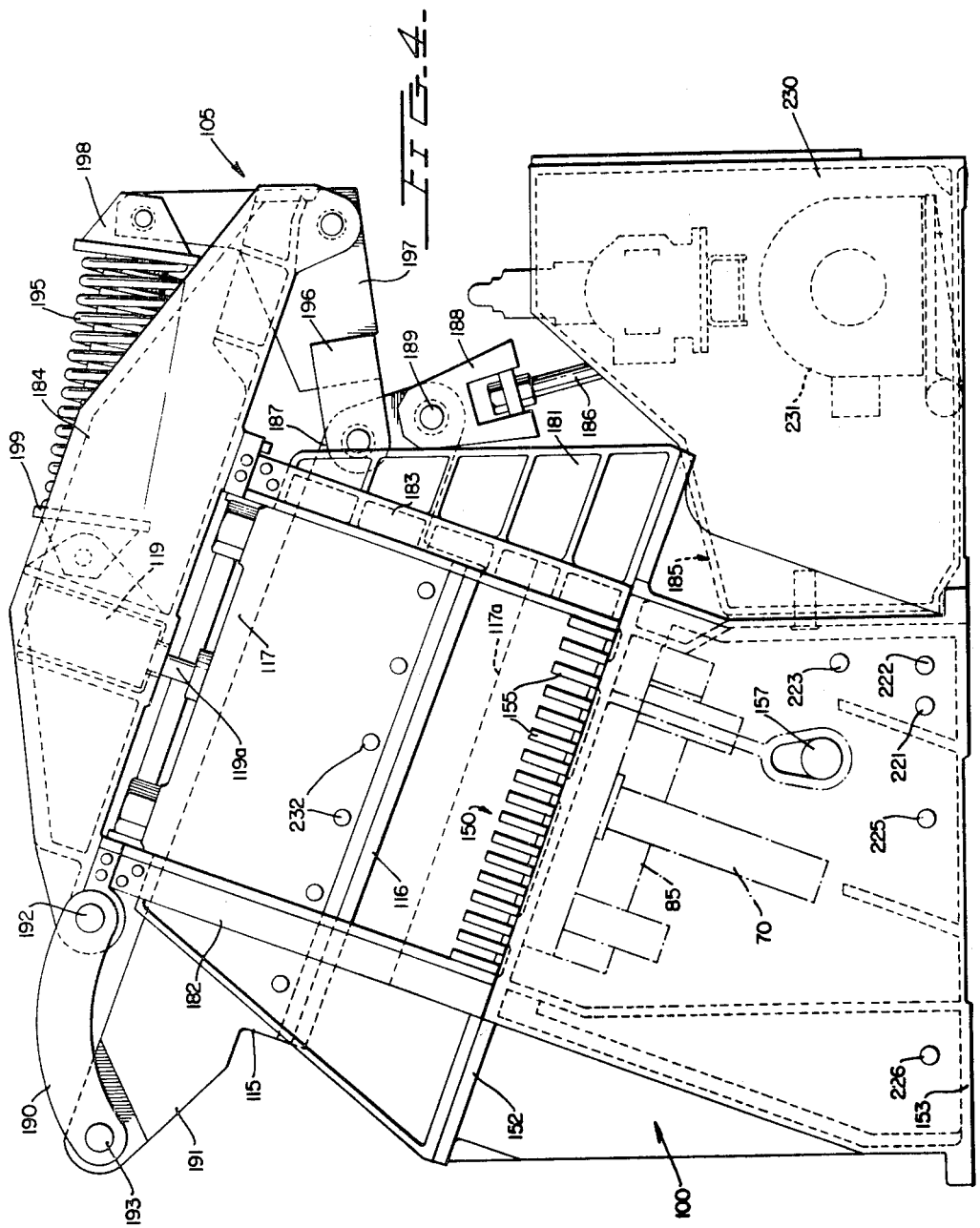

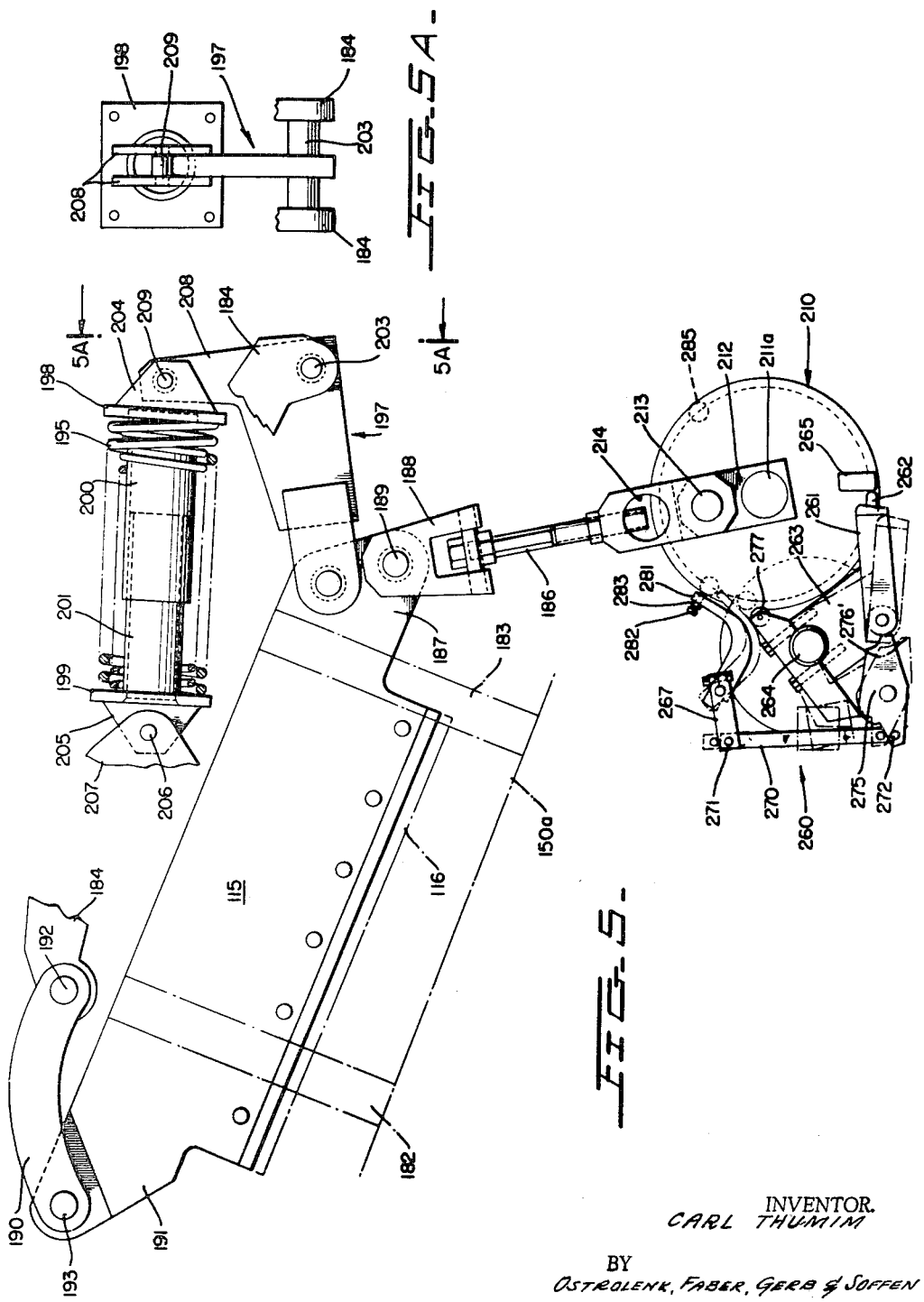

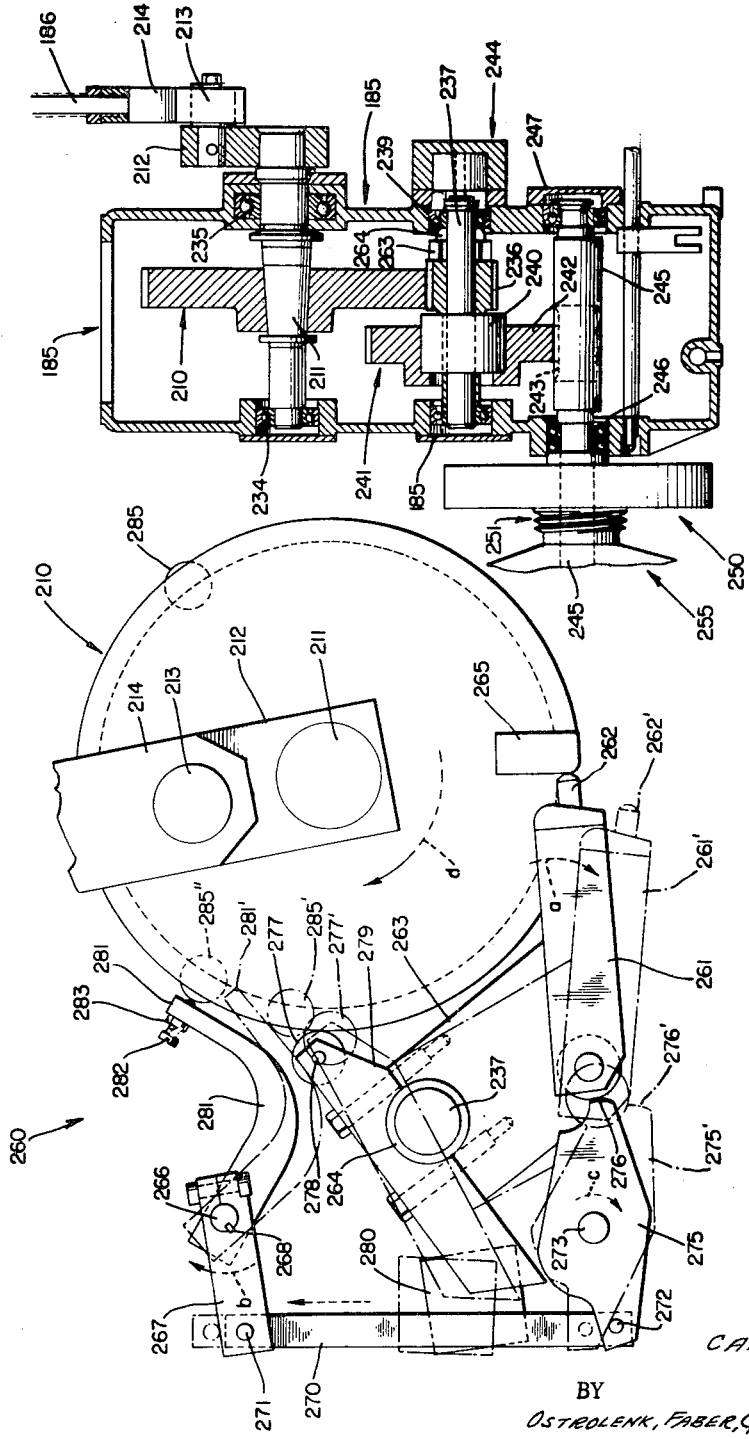

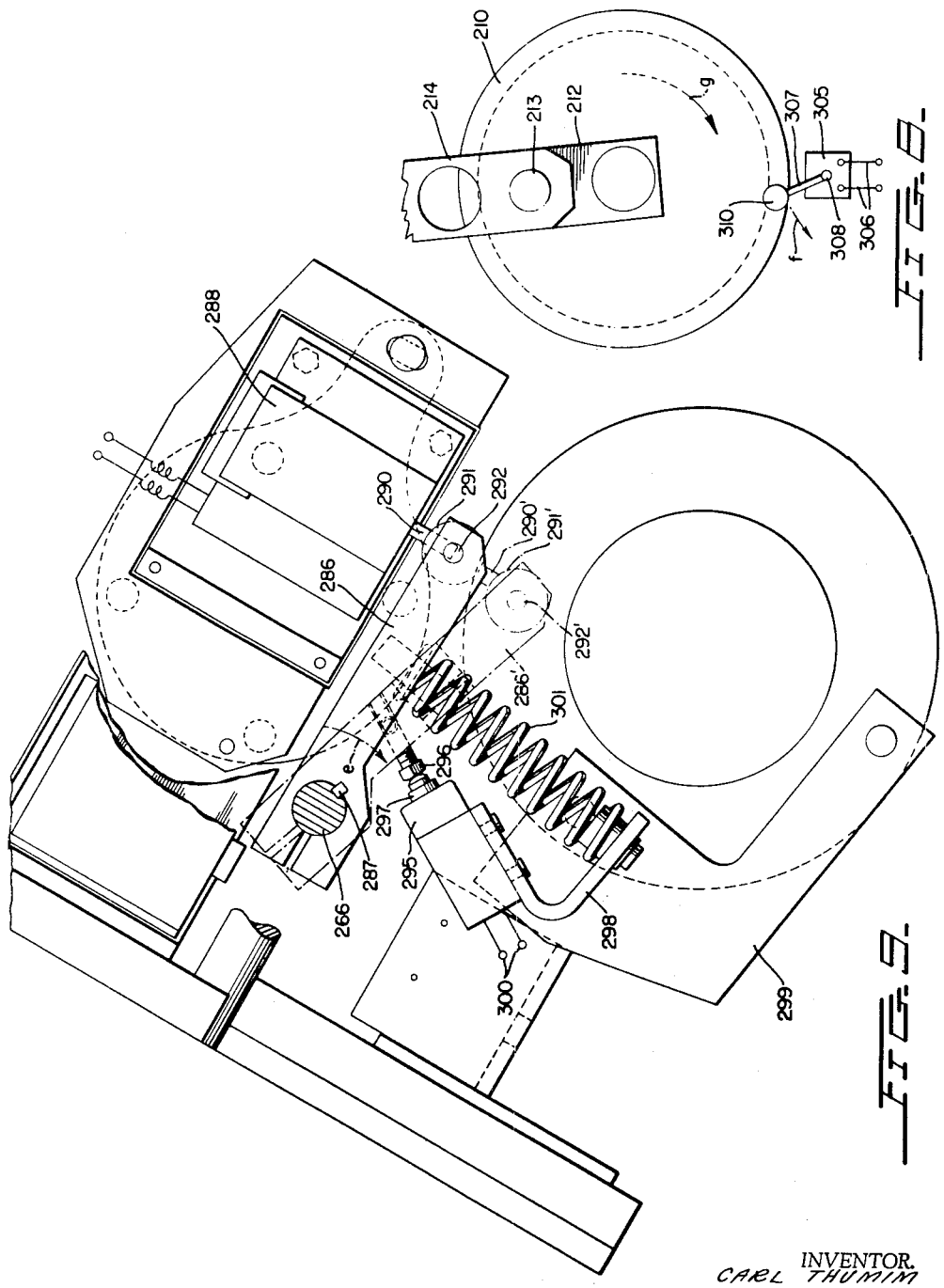

Dec. 28, 1965
C. THUMIM
3,225,637
RECIPROCABLE CUTTING MECHANISM
FOR AUTOMATIC CUTTING MACHINES
Original Filed Nov. 7, 1956
7 Sheets-Sheet 7
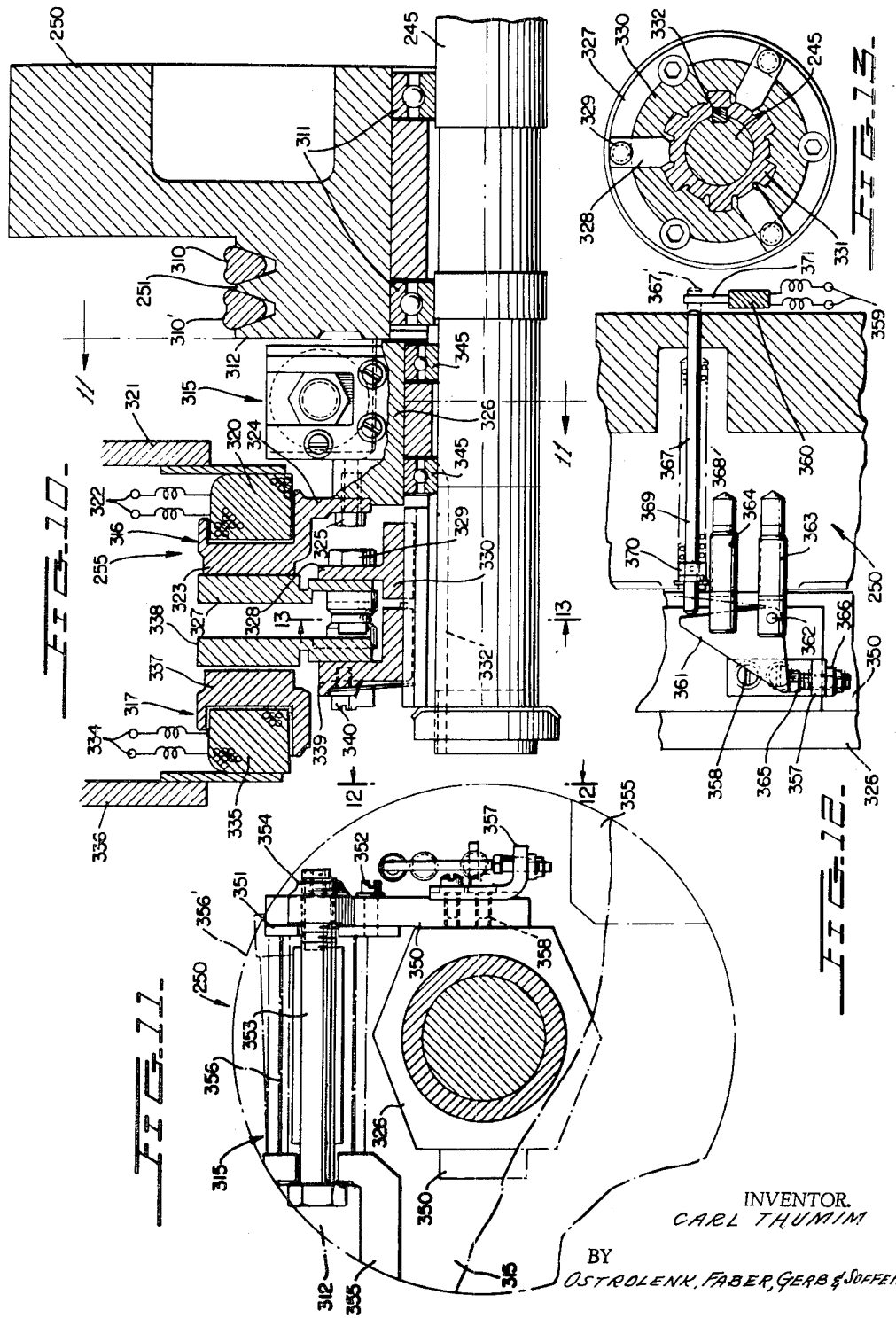
INVENTOR.
CARL THUMIM
BY
OSTROLENK, FABER, GERB & SOFFEN
ATTORNEYS

United States Patent Office 3,225,637
Patented Dec. 28, 1965

3,225,637
RECIPROCABLE CUTTING MECHANISM FOR AUTOMATIC CUTTING MACHINES
Carl Thumim, Lombard, Ill., assignor to Miehle-Goss-Dexter, Inc., Chicago, Ill., a corporation of Delaware
Original application Nov. 7, 1956, Ser. No. 620,928, now Patent No. 3,033,067, dated May 8, 1962. Divided and this application Feb. 13, 1962, Ser. No. 173,074
4 Claims. (Cl. 83—526)

This patent application is a division of my copending case Serial No. 620,928 filed on November 7, 1965, now Patent No. 3,033,067 for "Automatic Cutting Machine" and assigned to the same assignee hereof.

This invention relates to reciprocable cutting mechanisms, and more particularly relates to novel reciprocable knife bar operating apparatus for effecting spaced transverse cuts along a stack of sheets.

In a cutting machine of the type herein, a stack of paper sheets is supported on a horizontal table. A reciprocable knife blade is provided at the front end of the machine to execute transverse cuts on the paper stack in a predetermined manner. Reference is made to Patent No. 2,570,873 as typical of such type of machine. A clamp for holding the paper stack intact is arranged adjacent the knife blade, to act upon the stack as it is being transversely cut. A back gauge is provided at the rear end of the stack, movable towards the front, along the table on which the stack is supported. The back gauge is moved in a predetermined manner to push the stack forward between cutting operations of the knife. A start-stop program device is generally related with the back gauge to automatically start its movement and stop it at predetermined positions during the cutting cycles of the knife assembly. Such back gauge system in a cutting machine is illustrated and described in Patent No. 2,487,031 entitled "Automatic Back Gauge Spacer" and assigned to the same assignee as this case.

The invention knife, as will be set forth in detail hereinafter, incorporates a novel single cycle nonrepeat device for operating the knife bar to cut only once upon an actuation and to prevent an uncontrolled descent of the knife bar until the next positive actuation therefor. Also, the novel knife mechanism is provided with a heavy spring that continually biases the knife in the upward position at all times, with a latch that keeps the knife from overtravelling beyond such upward position for safety purposes. With the knife thus maintained normally in the up or out-of-cutting position, the knife blade can be actuated downwardly only after the definite positive latch is released. Thus, should anything be wrong with the machine or knife mechanism, the knife blade will safely be out-of-cutting position. Other advantageous features for the novel knife cutting system herein will be set forth in detail hereinafter.

It is accordingly a primary object of the present invention to provide a novel reciprocable cutting mechanism.

A further object of the present invention is to provide a novel cutting blade mechanism with a single cycle non-repeating operation for safety purposes.

Another object of the present invention is to provide a novel cutting mechanism for a cutting machine incorporating a sizeable spring that normally biases the cutting blade in its upward or non-cutting position.

These and other objects, features and advantages of the invention will become more apparent from the following description of an exemplary embodiment thereof, illustrated in the drawings, in which:

FIGURE 3 is a perspective view of the exemplary machine, with portions thereof removed for the purposes of clarity of illustration, and showing the exemplary cutting apparatus.

FIGURE 4 is an enlarged illustration seen in end elevation of the cutting machine with the side frame and protective end hood removed, showing the cutting assembly, with associated portions thereof in dotted lines.

FIGURE 5 is a schematic mechanical arrangement of the cutting knife assembly including its drive elements and single cycle safety control.

FIGURE 5A is a side view of a portion of the linkage of the cutting mechanism as seen along line 5A—5A of FIGURE 5 in the direction of the arrows.

FIGURE 6 is a cross-sectional view through the power drive mechanism of the knife assembly.

FIGURE 7 is an enlarged view of the mechanism providing the single cycle non-repeat operation of the cutting blade, also as seen in the lower portion of FIGURE 5.

FIGURES 8 and 9 are further details of the single cycle non-repeat device of FIGURE 7.

FIGURE 10 is an enlarged cross-sectional view of the drive control mechanism for the knife assembly.

FIGURE 11 is an enlarged end view of the overload device of the knife drive mechanism of FIGURE 10 as seen along the line 11—11 of FIGURE 10 in the direction of the arrows.

FIGURE 12 is an end view of the overload switch in the knife overload device as seen from the line 12—12 of FIGURE 11 in the direction of the arrows.

FIGURE 13 is a sectional view through the knife drive mechanism of FIGURE 10 taken along the line 13—13 thereof.

Figure 1:
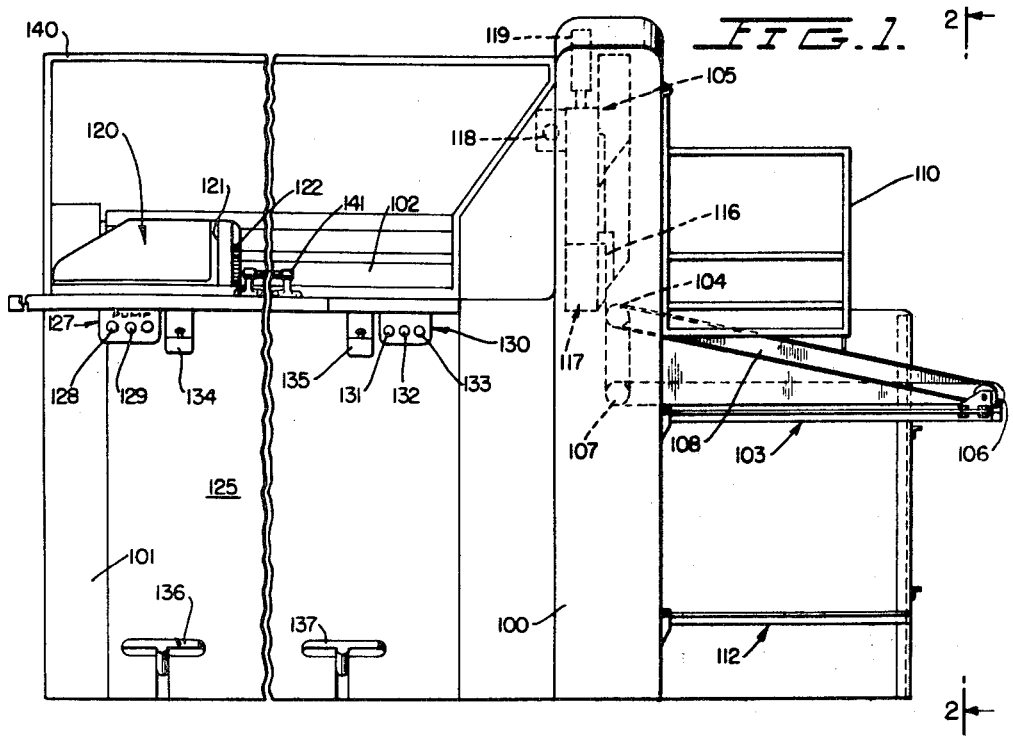
FIGURE 1 is a side elevational view of a cutting machine incorporating the exemplary reciprocable cutting mechanism as seen from the operator position with the central portion thereof broken away.
Figure 2:
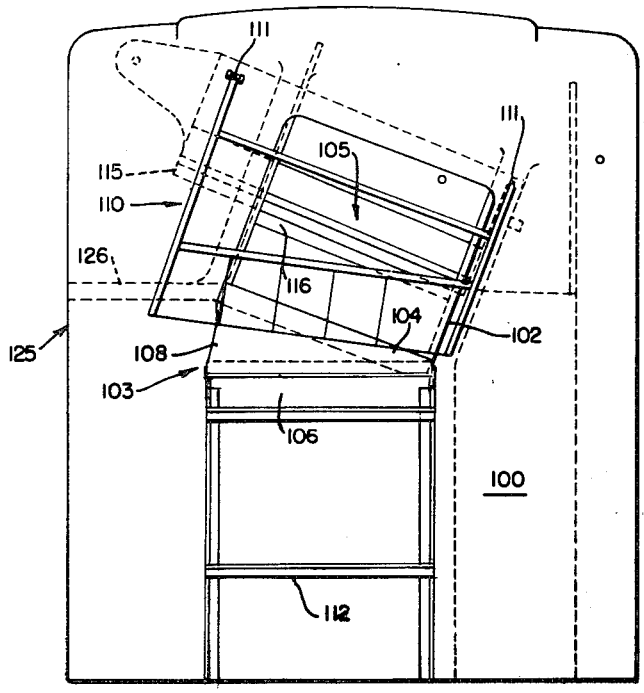
FIGURE 2 is an end elevational view of the cutting machine of FIGURE 1 at the "front" or "feed-out" position.

FIGURES 1 and 2 show the side and "front" end elevations, respectively, of the cutting machine. The "front" end, as is normally termed in such commercial machines, will be herein also termed the "feed-out" position, corresponding to the position on the right end of the machine seen in FIGURE 1, and as seen in elevation in FIGURE 2. The front portion of the stack of sheets, after being cut off, is fed out from the "feed-out" end.

The main column 100 of the machine supports the guide supports for the knife cutting assembly, as will be detailed hereinafter, as well as the frame section of the balance of the machine including the work table. The left side column 101 is an additional support for the machine and includes the circuit and relay panel for the electrical control system herein. Main column 100 serves also as an oil reservoir for the hydraulic servo components of the machine. The work table (not seen in FIGURES 1 and 2) is arranged at a small angle to the horizontal plane, the left side of the table as viewed from feed-out end of FIGURE 2 being raised above the right end.

A side gauge 102 is at the right side of the work table (FIGURE 2); the corresponding longitudinal side of the stacks of sheets rests against side gauge 102. Side gauge 102 is perpendicular to the tilted work table. A conveyor system 103 starts at tilted roller 104 adjacent the cutting position under knife assembly 105 and extends to horizontal roller 106. An idler roller 107 completes the circuit of the conveyor sheet 108.

A hood 110 is mounted above conveyor 103, covering up the external access to knife assembly 105 for safety purposes. Hood 110 is hinged at 111, providing a suitable protecting means with ready accessibility to the cutting position at the "feed-out" end of the machine. Hood 110 may be of sheet metal with transparent panes of glass or Plexiglas. A safety switch (not shown) is actuated by hood 110 when opened up, shutting off the electrical control circuits of the machine, stopping the action of the knife assembly 105 and of the other sections as well. Thus, the safety hood 110 prevents accidents to fingers of the operator since the knife and the machine are stopped when the hood is opened. A frame 112 extends from the main column 100 and serves to support conveyor assembly 103. The cutting knife assembly 105 is shown in dotted lines, within the machine, in FIGURES 1 and 2. The general outline and correlation of the basic components of cutting mechanism 105 as seen in these figures is as follows: The knife bar 115 is supported in suitable guides and carries the knife blade 116 at its lower cutout section. Knife assembly 115, 116 is arranged at the angle horizontal to coact normally with the work bed and stack carried at the same angle, for the purposes to be more fully described. Knife blade 116 is demountable from knife bar 115 for replacement or sharpening.

A front or knife clamp 117 is arranged contiguous to and behind knife bar 115. Suitable control means are operated on clamp 117 to press it down on the front sector of a stack of sheets in the machine just prior to cutting by knife blade 116. The stack of sheets is held firmly adjacent the transverse cutting position wherein the reciprocable knife blade 116 effects the transverse cut, as is understood by those skilled in the art. A suitable torsion bar 118 and hydraulic cylinder 119 are associated with the clamp 117 for its motivation. The exemplary knife assembly 105 is in the class known as guillotine cutters. Further details of this assembly will be shown and described in connection with FIGURES 3, 4 and 5.

The back gauge 120 traverses the machine along its full operating length in the longitudinal direction. It is secured to the work table (see FIGURE 3). Back gauge 120 incorporates a vertical frame 121 that pushes the end of the stack of sheets on the work table forward to cutting blade 116. The back gauge 120 incorporates a series of fingers 122 of the back gauge clamp. The fingers 122 of the back gauge clamp as seen in progression in FIGURE 1 in view of the tilt of the back gauge with the horizontal. Their function is to press against the top layer of the back end of the stack of sheets in the cutting machine and firmly grip the whole back end of the stack or stacks throughout the cycles of the cutting program. In other words, the positive gripping of the stack or stacks on the work table by the fingers 122 of the back gauge clamp and the resting of the side of the stack against tilted side gauge 102 eliminates "walking" of the sheets on the stack and its angular dislocation due to the front clamp action (117).

It is thus practical to arrange the loading of the stacks from the side of the machine 125 (FIGURE 1). This is more efficient in production as the stacks or piles to be cut into book pages or wrappers, etc., are long, such as 40" to 60". These stacks are slid along the horizontal side work table 126 and across to the work bed of the machine (150—FIGURE 3) all from the machine side 125. The operator and the controls for the machine are arranged at side 125 for the progress of the cutting program on the sheets. Control panel 127 contains the start 128 and stop 129 control switches for operating the pump of the hydraulic system.

Electrical panel 130 contains the switches for controlling the operation of the back gauge with control button 131 for the forward movement, control button 132 for the reverse movement, and control button 133 for stop. These controls in panel 130 are manual over-rides by the operator for the action of the back gauge independent of the automatic programming of the machine operation. Similarly, there are two over-riding controls for the action of knife assembly 105; electrical control 134 arranged at the left side of the machine and control 135 at the right side of the operating position. Either one of these switches 134, 135 over-rides the automatic programming action of the knife assembly 105 whereby the operator can actuate knife blade 116 into cutting whenever desired. Similarly, a pedal for operating the hydraulic action of the back gauge clamp is arranged at 136, and pedal for operator actuation of the front clamp 117 at 137.

For purposes of clarity of presentation and detail description of the novel contributions and features of the present invention, the start-stop back gauge programming system and control for the machine is not illustrated, as any specific or otherwise known programming system may be incorporated herewith. For example, a system per Patent No. 2,487,031 referred to or of application Serial No. 571, 518 (assigned to the same assignee as this case) may be employed. Further details of the overall electrical and hydraulic control systems for the individual machine components and their automatic and/or manual sequential or specific actuation are omitted to simplify the description, as such are apparent to those skilled in the art. Reference to the aforesaid patent application is made for a control system usable herein.

A safety hood 140 is provided over the work bed, the work thereon, and the back gauge 120. Hood 140 has a handle 141 to lift it out of the way when loading, unloading or otherwise by the operator. A safety switch (not shown) is actuated upon opening of hood 140, whereby all elements of the cutting machine are stopped from forward movement or actuation. This safety feature is important to the operator. A large panel of glass or Plexiglas may be arranged in hood 140 which is otherwise of sheet metal.

CUTTING MACHINE: MAIN OPERATING UNITS

FIGURE 3 is a perspective illustration of the cutting machine showing the essential operating units and their correlation. For the purposes of clarity of illustration in FIGURE 3, the protective hoods, the conveyor system 103, the side table 126, the main supports and housing of the machine, and the start-stop programming control unit have all been omitted from this figure. Also, a stack or stacks of sheets is not shown on the work table to simplify the illustration but will readily be understood by those skilled in the art.

(a) Tilted work table

The work table 150 is seen to extend from the rear of the machine (at the right—FIGURE 3) longitudinally through the machine to the "front" or feed-out end adjacent knife assembly 105. The rear of work table 150 is supported on a hollow frame member 151, in turn supported on main upright 101. The front end (left—FIGURE 3) of work table 150 is supported directly on the inclined surface 152 of main column 100. Work table 150 is comprised of a series of spaced parallel flat bars 155. The spacing between the bars 155 is substantially equal to the width of the bars in the transverse direction. In a practical embodiment, the transverse width of table bars 155 may be of the order of ½", ¾", or 1"; and the spaces between these bars of the same dimension as the selected bar widths. It will now be apparent that the work table area that the stack rides on has the order of 50% less frictional contact with the work bed as compared to a solid work bed of the prior art. Thus, the paper stack is pushed by the back gauge 120 along work table 150 with a substantially less frictional drag.

Also, cuttings and trimmings of paper and other debris, due to the operation of the machine on paper stacks, readily fall through the open spaces between the parallel bars 155 comprising the work table. The work table 150 is accordingly readily maintained clean, and has a reduced friction for the stack movements thereon. Such reduced friction to the movements of the paper stack on the work table further enhances the maintaining of the stack in its vertical alignment and minimizes any tendency of the stack to "walk" or otherwise distort when being operated upon. Another important purpose of the spaced bar work table 150 construction is to provide room for the lower movable members of the back gauge clamp. The work table 150 and the inclined surface 152 of column 100 upon which it is mounted are inclined at a fixed small angle to the horizontal plane of the machine, which angle we shall for purposes of references refer to as $\theta$. In practice, the angle $\theta$ actually used may range from 1° to 20°, but this is optional. Even a small angle of tilt to horizontal for $\theta$ has been found to attain satisfactory results herein. In one practical embodiment $\theta$ equalled 3°.

The back gauge 120 and its associated back gauge clamp 122, 123 are movably mounted on work table 150 and parallel thereto at the same inclined angle to the horizontal. Similarly, the knife apparatus 105 including front clamp 117 and the knife assembly 115, 116 are mounted at the same angle 0° to the horizontal plane, rendering the cutting blade assembly parallel to the surface of cutting table 150. The bottom cutting edge of blade 116 is further inclined to the horizontal to effect a guillotine type of cut.

(b) Back gauge

The back gauge assembly 120 moves longitudinally of the machine and along the work table 150. The function, details and operation of the back gauge 120 and the associated back clamp 122, 123 is set forth in the aforesaid parent patent application at the heading "Back Gauge and Back Gauge Clamp" in connection with the description of FIGURES 18, 19 and 20 thereof. The back gauge 120 comprises vertical pusher frame 121 that abuts the rear end of the stacked sheets. The frame portion 121 is segmented and projects through the openings in work table 150 between horizontal bars 155. A bracket 156 extends from the bottom of the back gauge, beneath work table 150, and is secured thereto.

The back gauge 120 is actuated along the work bed 150 in the forward and rearward direction through hydraulic cylinder 157 by piston rod 158 extending from cylinder 157 and a pantograph linkage 160. The pantograph 160 linkage between hydraulic cylinder 157 and back gauge 120 (at bracket 156) permits a long swing of the piston rod 158 to subtend the working excursion of back gauge 120 on work table 150. In a practical embodiment, such swing was 60". It is to be noted that the hydraulic cylinder 157 is held horizontal and longitudinal of the machine, parallel to the direction of movement of back gauge 120. It is important to maintain piston rod 158 in a horizontal plane to prevent distortion and malfunctioning of its hydraulic drive for the back gauge. This is accomplished by pantograph 160 in a manner set forth in detail in said parent case in connection with the description of FIGURES 21 and 22 thereof, under the heading "Back Gauge Drive Mechanism."

(c) Back gauge clamp

The back gauge clamp comprises movable fingers 122, 122 projecting between the open spaces of the vertical bars of the pusher section 121 of back gauge 120. The fingers 122, 122 are operable in the vertical direction, within vertical frame 121, by means detailed in said parent case in connection with the description of FIGURES 18, 19 and 20 thereof, under the heading "Back Gauge and Back Gauge Clamp." A series of stationary fingers 123, 123 are located beneath the movable fingers 122, 122. The top surface of stationary fingers 123, 123 is a small distance above the plane of work table 150, the stationary fingers 123, 123 of the back gauge clamp are arranged in the interstices of bars 155, 155 of table 150 and are secured to a projecting portion of the back clamp structure 120.

When the movable fingers 122, 122 of the back gauge clamp are activated downwardly, they grip the tail end of the stack or stacks of sheets against the pusher surface 121 of the back gauge, pressing the stacks between the coacting pairs of fingers 122, 123. The intensity of force exerted by this clamp 122, 123 of the back gauge on the stack is made at least equal to, and preferably greater than, the intensity of force exerted by the front clamp 117 at the forward end of the stack. In other words, the clamp 117 used for cutting purposes at the front stack end must not be able to loosen the stack of sheets that is held by back gauge clamp 122, 123 under any conditions of operation. The back gauge clamp 122, 123 is arranged to exert a powerful grip and travels with the back gauge 120 forming in effect, a travelling table for the paper stack as it is moved forward to the successive transverse cutting positions.

Thus, the stack or parallel stacks of sheets will not become distorted, and the printing on successive sheets will remain in accurate vertical alignment in all cutting operations by the knife 115, 116. Such clamping of the rear end of the stack permits the motivation of the back gauge, and the speed of the operating cycle between cuts, to be faster than heretofore possible with practical commercial cutting machines. With the exemplary machine, there is no danger of distorting or "walking" of the pile of sheets; particularly in view of the combination of the back gauge clamp 122, 123 with the tilted work table. Such combination virtually secures the stack in proper operating alignment regardless of possible distortions due to speed of travel, deceleration of the stack or operation of the knife assembly 105 and its associated clamp 117. It also becomes unnecessary for the operator to remain at the feed-out position of the work table at the cutting position for readjusting the stack that may otherwise have become distorted.

The cycling and motivation of the back gauge, through hydraulic cylinder 157, is controlled in the usual manner for automatic cutting machines such as on a start-stop programming device (as described in Patents Nos. 2,487,- 031 and 2,053,499), or otherwise.

The side gauge 102 extends perpendicular from the plane of work table 150 and the paper stacks rest against side gauge 102 due to the tilting of the table 150.

(d) Knife assembly

The cutting knife assembly 105 is mounted adjacent the front or "feed-out" end of the machine. The vertical main supports 180, 181 for the cutting assembly 105 are secured to the inclined surface 152 of the main column 100. Guide supports 182, 183 for containing the movement of knife assembly 115, 116 and clamp 117 are secured to and otherwise bolted to the vertical supports 180, 181. The top beam 184 for the assembly 105 is supported across the supports 180, 183 as more clearly shown in FIGURE 4. The knife bar 115 is reciprocably mounted in the guide supports 182, 183 and actuated by a crank mechanism extending from the gear mechanism box 185. Details of the knife drive mechanism within gear box 185 are shown and described hereinafter in connection with FIGURES 6 through 13 and constitute important features of the present invention.

A draw bar 186 extends from a crank 212 within gear box 185 and is linked to ear 187 extending from knife bar 115 through link 188 pivoted at 189. The opposite end of knife bar 115 is pivotally supported from the top cross beam 184, through link 190 connecting rear ear 191 of knife bar 115 to the pivoted end 192 of beam 184. Pivot 192 is preferably a bearing surface, to minimize friction; as is the pivot 193 between link 190 and the knife bar. A heavy spring 195 is mounted within a cavity of cross beam 184 and arranged in a further linkage to the knife bar 115, including elements 196, 197, 198 and 199 shown in more detail in FIGURES 4 and 5 hereinafter.

The purpose of the heavy spring 195 and its associated linkages with knife bar 115 is to normally bias or otherwise maintain knife bar 115 in its upward, non-operative position. In other words, spring 195 is arranged to keep the knife blade 116 in knife bar 115 normally at all times when non-operating in the upward position so as not to cause injury to the operator or stack should any component of the knife mechanism 105 or other part of the drive become broken or inoperative. Further advantages and details of this construction are set forth hereinafter.

Actuation of the knife draw bar 186 by the crank mechanism in gear box 185 is on a cyclic basis under the control of the start-stop programming system. The hydraulic cylinder 119 for actuating front clamp 117 is seen in dotted lines in FIGURE 3. Cylinder 119 is supported in cross-beam 184. The torque bar 118 is connected to front clamp 117 for the purpose of keeping the clamp in the position parallel with the work table 150 under all clamping operations despite the thickness of height of the stack of sheets. Further details of the operation of torque bar 118 and its associated mechanism are described in connection wtih FIGURES 14 through 17 of said parent case under the heading "Front (Knife) Clamp System."

*(e) Ejector mechanism*

At the forward or feed-out location of the cutting machine is located an ejector mechanism whereby the last remaining portion of the stack is mechanically moved forward from the work table 150 into the conveyor 108 (FIGURES 1 and 2). The ejector is illustrated in detail and described in connection with FIGURES 23 and 24 of said parent case under the heading Ejector Mechanism. Shown in dotted lines in FIGURE 3 is a shaft 215 rotatably supported in the frame of the machine. A pulley 216 is secured to shaft 215. A cable 217 is arranged to rotate shaft 215 counterclockwise when pulled downwardly by actuating bar 218. Actuating bar 218 is pivoted at 219 and is controlled to operate downwardly when the back gauge is moved to a predetermined position at the end of the program of cutting.

Rod 218 may be actuated electrically through a solenoid or mechanically by a suitable element under the control of the position of the back gauge after the last cut on the stack. The downward movement of cable 217 when effectuated rotates shaft 215 and the series of spaced fingers 220 secured to rod 215. The ejector fingers 220 are positioned to be moved between the spaces of bars 115 of table 150 and engage the end portion of the cut paper stack. It moves such stack portion outward of the machine into the conveyor 103.

The position of the back gauge 120 for actuation of lever 218 and the ejecting mechanism herein is preferably when the back gauge is already in its return rearward movement and has already moved back toward its starting position by a predetermined amount. Actuation of lever 218 and ejecting fingers 220 will thus operate upon the last portion of the cut stack without interference from the back gauge 120 and back gauge clamp 122, 123. The ejector is operated after the last cutting stroke of the knife assembly 105 and when the clamp 117 and knife 115, 116 are in their upward position. The remaining stack portion is moved forward out of the machine. The back gauge, when at a predetermined further position in its return movement, de-energizes the ejector actuating lever 218. The spring biased cable 217 thereupon returns to the initial position, as indicated in FIGURE 3.

The machine of FIGURE 3 is further strengthened by cross-bars 221, 222 at 223 at the back side portion forming triangular strut 224. Further cross bars 225 and 226 strengthen the vertical structure between the main vertical supports 100, 101. Additional strengthening struts and cross bars, supporting members and the like are, of course, optional. The location of the mechanical, electrical and hydraulic control elements are a matter of choice, as are the locations of the control levers, pedals and switches.

KNIFE OPERATING ASSEMBLY

A number of novel features are incorporated in the exemplary knife operating assembly and mechanism. FIGURES 4 and 5 illustrate the knife assembly. The exemplary knife 115, 116 is reciprocable and arranged perpendicular to the table 150 for the stack of sheets to be cut along predetermined transverse lines. One side, the right edge (FIGURE 4), of the knife blade 116 is somewhat closer to the work bed 150 in order to effect the well-known guillotine action of cutting. The knife assembly is seen extending from the top surface 152 of the main support 100. The surface 152 is at the angle $\Theta°$ to the horizontal base 153 of support 100 that rests on the ground. In other words, the knife assembly 105 and work table 150 supported on surface 152 of base 100 are arranged at the predetermined angle $\Theta°$ to the horizontal, corresponding to the selected angle of work table 150 described hereinabove.

The side upright members 180, 181 extend from the surface 152; and the vertical guide bars 182, 183 are supported by the inside faces of supports 180, 181 as already described in connection with FIGURE 3. The front or knife clamp 117 is shown in its upward position (solid lines at top, FIGURE 4). The hydraulic cylinder 119 that actuates clamp 117 in its vertical or reciprocal traverse is connected to clamp 117 through the piston rod 119a. The bottom edge 117a of the clamp 117 is shown in dotted lines (FIGURE 4), representing a possible position for the bottom of the clamp 117 when juxtaposed against the top of a stack of sheets when held between the clamp and the work bed 150.

It is to be understood that actuation of front clamp 117 by cylinder 119 is effected just before the cutting stroke by knife blade 115, 116 on the stack. The purpose of the clamp is to maintain a forceful constant pressure on the stack just prior to, and during, the full cutting cycle by the knife assembly 105 and is thereupon released to its upward position above the paper stack. Such release of clamp 117 permits the back gauge to move the stack forward through the underside of the clamp 117 and knife blade 116 during the movement portion of the cycle prior to the next cutting position on the stack. Control of the clamp hydraulic cylinder 119 is effected by the control system for the machine, duly synchronized with the other machine motions.

At the right side of the machine, in FIGURE 4, is seen a housing 230 that is an extension of the main upright 100 and contains an oil supply and a pump mechanism 231 for the purposes herein, as understood by those skilled in the art. To the rear of oil housing 230 is the drive gear mechanism housing 185 for the knife assembly 105, seen more fully in FIGURE 3. The draw bar 186 extending from the gear box 185 is used to reciprocate the knife bar 115 into its downward cutting stroke. The described linkage of the knife bar 115 at both of its ends and to cross beam 184 permits a proper reciprocating stroke for the knife bar 115 to effect the guillotine cutting action by the knife blade 116 supported in the knife bar 115 by suitable fastening, such as bolts 232.

As previously stated, the large helical spring 195 located between the pivotal plates 198, 199 and connected to the linkage 197 to the knife bar at ear 187 affords the upward biasing action on the knife bar 115. This action by spring 195 serves to keep the knife bar 115 and its associated blade 116 in the upward position when the driving mechanism for the knife 115, 116 is not operating or is defective. Further details of this arrangement are set forth in the drawing of the knife operating assembly, FIGURES 5 and 5A.

Referring to FIGURES 5 and 5A, it is seen that reciprocable knife bar 115, riding in knife bar guides 182, 183, is pivoted in the fixed top beam 184 and its pivotal points 193 and 202. Projecting ear 191 of knife bar 115 is thus pivoted with respect to the fixed bearing 192 in beam 184 through link 190 and its associated pivot or bearing 193. The opposite projecting ear 187 of knife bar 115 is also pivoted in stationary top beam 184 at pivot 203 through linkage 197 coupled to portion 196 pivoted in bearing 202 of the knife bar 115. The reciprocating motion of the draw bar 186 from the drive mechanism is transmitted to the knife bar at ear 187 across the link 188 connecting ear 187 with the draw bar 186, across bearing pivot 189. As the draw bar 186 is pulled downwardly (in FIGURE 5) the knife bar 115 and its associated blade 115 are moved downwardly along the guide bars 182, 183.

The arm 208 of link 197 thereupon presses the spring 195 by moving the end plate 198 and its associated cylinder 200 toward the pivotal plate 199 and telescoping over its associated cylinder 201. Plate 199 has extending ears 205 which pivots at 206 to an internal portion 207 of top beam 184. Similarly, projecting ears 204 from plate end 198 affords a pivot at 209 with the arm 208 of linkage 197 as seen in FIGURES 5 and 5A. Thus, when the knife blade 116 moves downward as the draw bar 186 is pulled downwardly, the blade 116 approaches the top 150a of the work bed and reaches the position 150a after cutting every sheet in the stack on the work bed 150. The extent of the stroke of the knife bar 115 is thus predetermined by the mechanism herein, and its adjustments, as will be understood by those skilled in the art.

The main drive gear 210 is indicated schematically in FIGURES 3 and 5 and is seen in the cross-sectional view (FIGURE 6) of gear box 185. The main crank shaft 211 is secured to and otherwise directly driven by the main gear 210. At the extending end 211a of the crank shaft is secured a crank arm 212. The terminal 214 of the draw bar 186 is operatively connected to crank 212 through crank pin 213. Accordingly, a 360° revolution of main gear 210 effectuates a pull-down stroke and return stroke of the pull-bar 186, correspondingly actuating the knife bar 115 with its knife blade 116 against the surface 150a of the work bed. It is to be understood that the knife bar 115 is also counter-balanced by the spring 195.

The actuation of the main gear 210 into a single cycle revolution (360°) is under the control of the master start-stop programming device and is effected: after the back gauge 120 has been stopped in the next cutting position; the knife clamp 117 has been moved down against the back to hold the front portion firmly for cutting; and the actuation of the knife drive apparatus occurred, as described hereinafter in connection with FIGURES 10 through 13. The stack of sheets are thereupon cut in guillotine fashion by the inclined blade 116 when the draw bar 186 linked to the knife bar 115 has executed its downward movement in the single cycle of rotation of the main gear 210.

The knife bar 115 and its associated blade 116 is returned directly to its upward position, through the inertia of the system and its balancing spring 195. Also, during the cutting cycle herein described, the back gauge clamp 122, 123 maintains a firm grip on the stack as set forth, with a pressure equal to or greater than that exerted by the front clamp 117. Associated with the main drive gear 210 is the knife control mechanism 260. The knife control mechanism 260 is illustrated in detail, and in enlarged views, in FIGURES 7, 8 and 9 and is thoroughly described under the heading "Knife Control Mechanism".

The purpose of the knife control mechanism 260 is to ensure a single cycle of operation of the main gear 210 and the knife 115, 116 for each cutting impulse from the programming system and to assure a non-repeating actuation of the knife assembly 105 and its associated gear 210 upon such single impulse. Furthermore, the system 260 affords a shock-absorbing function due to the inertia of the drive gear 210 in its rotation and operation of the knife bar 115, through a dash-pot and a lug that is secured to the face of main gear 210. The function of the mechanism 260 as detailed in FIGURES 7, 8 and 9 is essentially for safety, and provides a novel addition to the cutting apparatus 105 for the herein or other reciprocable cutting mechanism.

FIGURE 6 shows the internal mechanism within gear box 185 already referred to hereinabove and shown in FIGURES 3 and 4. The crank shaft 212 is rotatably supported in the sides of box 185, through anti-friction bearings 234, 235. The main drive gear 210 is firmly secured to the tapered crank shaft 211 as heretofore stated and engages the pinion 236. Pinion 236 is splined to the intermediate shaft 237, in turn supported in gear box 185 by anti-friction bearings 238, 239. Pinion 236 extends into the overunning clutch 240 at the inner race thereof. Pinion 236 is integral with the inner race of the over-running clutch 240.

Over-running clutch 240 permits the rotation of pinion 236 and its associated main drive gear 210 only in the desired single direction. The outer clutch face 241 slips in its relation to main gear 210 should a reverse direction of operation be attempted. The intermediate shaft 237, secured to the inner race of over-running clutch 240, extends to the right (FIGURE 6) outside gear box 185 to a second over-running clutch 244 mounted on the exterior of gear box 185. Intermediate shaft 237 is thus connected to the inner races of both the over-running clutches 240 and 244. The outer race of outer clutch 244 is secured to the gear case housing 185. The outer race 241 of the inner over-running clutch 240 is secured to an integral gear 242. Gear 242 engages pinion 243, that is an integral part of main drive shaft 245. Main drive shaft 245 is rotatably supported in the gear box housing 185 through anti-friction bearings 246, 247.

Main drive shaft 245 extends to the left (FIGURE 6) through the gear box 185. On the extending end of main drive shaft 245 is rotatably supported a fly wheel 250, as is shown in cross-sectional view, FIGURE 10. A pulley 251 is incorporated in the hub of fly wheel 250 in order to effect a pulley belt drive of the main shaft 245 through stabilizing fly wheel 250 rotatably supported on shaft 245. A suitable electric motor drive (not shown) rotating the belts 310—310' on the pulley 251, affords the drive on fly wheel 250, and the main drive shaft 245, on a continuous basis. Extending further to the left (FIGURE 6) of main drive shaft 245 and fly wheel 250 is the drive apparatus 255 for controlling the drive of the main shaft 245. The apparatus 255 is described in detail under the heading Knife Drive Apparatus as illustrated in FIGURES 10 through 13.

Summarizing the action of the mechanism within housing 185 shown in FIGURE 6. The main rotative power or energy for actuation of the knife blade is imparted to the fly wheel 250 through its pulley hub 251. The main drive shaft 245 is operated intermittently through the clutch-brake control apparatus 255 shown in detail in FIGURES 10 through 13. Upon a control signal actuation from the start-stop programming mechanism referred to, the clutch brake drive apparatus 255 is energized to transmit the fly wheel rotational energy 250 to the drive shaft 245. The shaft 245 transmits the rotational energy through its integral pinion 243 to the gear 242 constituting the outer race of over-running clutch 240. The intermediate shaft 237 is thereuon motivated, as it is secured to the pinion 236 that, in turn, is formed integrally with the inner race of over-running clutch 240. Pinion 236 drives the main gear 210.

The crank arm 212 is motivated by gear 210 through the crank shaft 211 secured thereto. The crank arm 212, being pinned through pin 213 to the linkage 214 attached to the knife pull bar 186, causes the knife to be "pulled" down. The knife bar 115 and its associated knife blade 116 are normally biased to their inoperative or upward position by the large spring 195 (FIGURES 3 to 5). The gearing action described herein has the function of pulling the knife down to perform the cutting action of the stack of sheets.

As lower or dead center of the main crank 212 is passed, the knife bar 115 will be pulled upward by the spring 195. In this manner, the crank 212 and its associated crank shaft 211 and main gear 210 are freed from the flywheel drive 250, through the over-running clutch 240. Thus, the flywheel 250 is free to stop at any point beyond the lower dead center position of the crank 212 as long as it does not overrun the knife bar 115 after the knife has reached its uppermost position.

The construction described herein has two main advantages. First, from the safety viewpoint, in case of any failure in the linkage in the mechanism between the flywheel 250 and the knife blade 116, the knife will always stay up. This advantage is important as the knife 115, 116 will not come down unexpectedly and cut whatever is in its path. It is safety for preservation of the stack of sheets, as well as of operator's hands. In other words, it is ensured that the knife blade 116 will remain up and out of the way should any part of the drive or the linkage between the drive and the knife bar 115 become inoperative or broken or for any reason.

Another important advantage in the described construction is that the brake in the drive mechanism 255 can effectuate its braking action on the drive shaft 245 over a latitude of almost 180° in stopping location. In prior arrangements, the stopping location of a brake on the drive shaft for a knife cutter was in the range of 2° or 3° as it was necessary to pinpoint the position of the knife in its upper position for the brake to be activated and hold the drive shaft and therefore the linkage to the knife from moving. Since the biasing spring 195 and the linkage associated therewith to the knife assembly 115, 116 acts to keep the knife assembly in its upper position independent of the drive, the brake can institute its action along a 180° return swing of the knife blade and crank 212 and its associated gear 210.

Since the over-running clutch 240 permits the crank 212 and its drive gear 210 to move ahead, with the knife assembly 115, 116 moving up faster than the drive through shaft 245 would impart (due to spring 195), the braking action between the fly wheel and the drive shaft 245 that occurs in mechanism 255 (as described in detail in connection with FIGURE 10), need not pinpoint the uppermost position of the knife assembly 115, 116 as will now be understood by those skilled in the art. It may effect its braking action on the drive shaft 245 independently of the upward swing of the knife assembly 115, 116.

Also assisting in this freedom of the brake to stop the drive shaft 245 is the single cycle non-repeating mechanism 260 for the control of the knife operating assembly 105 to be described hereinafter in connection with FIGURES 7, 8 and 9 under the heading "Knife Control Mechanism." The over-running clutch 244 operating at the end of intermediate shaft 237 is used to stop the knife assembly 115, 117 at any point in its downward stroke. It has a "no back" action when the clutch is disconnected and before the brake takes hold. It prevents any upward jerk (during that small interval) due to the to the biasing spring 195.

KNIFE CONTROL MECHANISM

FIGURE 7 is an enlarged view, in elevation, of the safety control mechanism 260, effecting a single cycle non-repeat action of the cutter assembly 105 upon a control signal, from the programming device. The mechanism 260 is associated with the main drive gear 210, as seen in FIGURE 5. It comprises a dashpot 261 having a projecting plunger 262. The dashpot assembly 261, 262 is supported by an arm 263. The dashpot arm 263 is pivotally secured to intermediate shaft 237 through bushing 264, as seen in FIGURES 6 and 7. The control mechanism 260 is arranged within the gear box housing 185 with the dashpot 261 under oil near the bottom thereof.

In its normal position, shown by solid lines, the dashpot 261 is arranged to have its plunger 262 abut a lug 265 that extends from a predetermined sector of the main drive gear 210. Thus, should the knife assembly 105 tend to overshoot a single cycle, and tend to cause the knife unit 115, 116 to return downwards to the cutting position without a signal therefor, lug 265 on main gear 210 will abut plunger 262 and the dashpot 261 will absorb the impact and stop the knife assembly. Such safety feature is utilized to avoid an unintended operation of the knife assembly 105. Means are provided for withdrawing the plunger 262 from its abutting relationship with gear lug 265, upon signal energization of the drive mechanism to initiate a cutting cycle of the knife assembly 105. The mechanism 260 is provided for this purpose, and for other advantageous features, now described in connection with FIGURES 7, 8 and 9.

As heretofore stated, dashpot 261 is tiltable downwardly in accordance with the dotted arrow a, namely in a clockwise direction (FIGURE 7). When it is desired to free the main gear 210 for executing a cutting cycle of the knife assembly 105, dashpot 261 is swung downwardly to remove the plunger 262 from the path of gear lug 265, to the dash line position 261'. The dash line position of the components of mechanism 260 indicate its "out of the way" position wherein the gear 210 is permitted to execute its knife operation cycle throughout a single 360° turn.

Means are provided to ensure the return of the dashpot 261 to the original or solid line position in abutting relationship with lug 265 before the completion of a 360° turn of main gear 210. The actuation of the dashpot 261 to the out-of-the-way dotted position 261' is initiated when the front or knife clamp 117 is energized into clamping action. In other words, at the end of the programmed stop of the back gauge forward movement, the front clamp 117 is energized towards its clamping action at the same time the mechanism 260 is actuated for removing the dashpot 261 and the plunger 262 from the path of the gear lug 265. Solenoid means and associated crank mechanism, in circuit with the signal circuit for the front clamp 117, effectuate the herein stated displacement of dashpot 261, as set forth in connection with the description of FIGURE 9 thereof.

The resultant action is to rotate the crank shaft 266 (FIGURES 7 and 9) by a predetermined amount in the clockwise direction as indicated by arrow b. A crank lever 267 is secured to crank shaft 266 by key 268. Crank lever 267 is pinned to link 270 by pin 271. The lower portion of link 270 is pinned to latch 275 by pin 272. Latch 275 is pinned to the main housing 185 by means of pin 273. With the rotation of crank shaft 266 in the direction of arrow b, the linkage 267, 270 raises the pinned end of latch 275 and moves the latch in the counterclockwise direction of arrow c, to the dashed line 275'. The cam tip 276 of latch 275 is thereupon moved to the out-of-the-way position 276', wherein the dashpot 261 is moved to its dotted out-of-the-way position 261' in the event lug 285 abuts its plunger 262.

As hereinabove stated, actuation of the solenoid means (FIGURE 9) to operate crank lever 266, and in turn move the latch cam tip 276 to its out-of-the-way position 276', is all initiated preferably upon the energization of the front clamp 117 just prior to the cutting stroke. However, it is to be understood that the exact point of actuation of mechanism 260 to the non-abutting position of dashpot 261 is optional within the principles herein. For example, such energization of the solenoid (FIGURE 9) to operate crank shaft 266 may occur coincidentally with the energization of the clutch driving means 255 (FIGURE 10) that in turn starts the gear drive for main gear 210 to operate the draw bar 186 for "pulling down" the knife bar 115 to effect the cut on the stack by blade 116.

In any event, as the main gear 210 executes its cutting cycle in the clockwise direction, arrow *d*, the lug 265 is not impeded by the plunger 262 as the cam tip 276 of latch 275 is out of the way at position 276', permitting the dashpot 261 to be in its out-of-the-way position 261'. As the main gear 210 continues its rotation along direction *d*, at some intermediate point lug 265 abuts the roller 277 pinned by pin 278 to an extension 279 of dashpot arm 263. This action ensures a positive replacement of the dashpot 261 to its solid and lug-abutting position 261. It is noted that a counterweight 280 is secured to the extension 279 of arm 263, and normally tends to raise the dashpot to its abutting position 261. However, should its action be sluggish or slower than the cycle of rotation of gear 210, the lug 265 abutment ensures the dashpot relocation to position 261 through the lug 265 impact on roller 277 as herein set forth.

Means are provided in the cranking mechanism to be described in connection with FIGURE 9, to also reset the linkage 267, 270 and the latch 275 to its normal abutting solid line position of FIGURE 7 after the initiation of the cutting cycle. Nevertheless, the mechanism 260 as seen in FIGURE 7 contains a safety resetting of the latch 275, before the completion of the rotation of the main gear 210, as will now be described.

An armature 281 is secured to the crank shaft 266. Armature 281 contains a screw 282 at its tip end, maintained in its adjusted position by lock nut 283. The screw 282 is abutted by a roller 285 which is on the main gear 210. Roller 285 is in the position 285', abutting the armature 281' in its dashed line position. As it proceeds clockwise to the dotted position 285", the roller has moved the armature 281 to its return or solid line position. In this manner the crank shaft 266 is assured a return to its normal repeating position as shown in solid lines, and remains in this position until the crank shaft 266 is again motivated by the solenoid apparatus of FIGURE 9.

The phasing of roller 285 on gear 210 is such that the roller 285 approaches its armature resetting position 285' during the downward stroke action of the knife bar 115. Thus, roller 285 returns the latch 275 in a positive manner to its locking position behind dashpot 261. This is a safety feature in case there is binding in the solenoid linkage between the mechanism of FIGURE 9, crank shaft 266 and links 267, 270, which binding may be too large for the springs of FIGURE 9 to overcome. In other words, on the downward stroke of the knife assembly 105 the safety mechanism 260 is set up by camming action, in addition to the normal spring forces which would actuate the safety movement of latch 275 just before the action of roller 285 on armature 281 may otherwise be effected. Should the latch be reset in the normal way by the spring of the mechanism of FIGURE 9, the armature 281 will be in its solid line position of FIGURE 7, out of the way of roller 285.

Crank shaft 266 extends through the gear box 119 and is fastened to an outside crank lever 286. Lever 286 is secured to crank shaft 266 by key 287, with the crank lever 286 in its normal position, as shown in solid lines in FIGURE 9. The crank shaft 266 is in its normal position for maintaining the latch 275 in the dashpot abutting position as shown in solid lines in FIGURE 7. The position of the crank lever at 286', shown in dashed lines in FIGURE 9, is effected by a clockwise displacement of lever 286 along the direction of dotted arrow *e*. Actuation of crank lever 286 to the actuated position 286' is effectuated by energization of the solenoid 288.

As heretofore stated, energization of electrical solenoid 288 is preferably performed in synchronism with the energization of the hydraulic circuit including cylinder 119 that motivates the front clamp 117 against the stack to be cut. Upon energization of solenoid 288, its plunger 290 is projected against the roller 291 pinned to the end of crank lever 286 by pin 292. Plunger 290 moves downward against the roller 291 until its maximum extension, as seen in dotted position 280', with the roller in the dotted extended position 291'. Thus, the turning of crank lever 286 to the position at 286' along the arrow *e*, simultaneously actuates crank shaft 266 to effect the latch 275 releasing action on the dashpot 261 (FIGURE 7).

Towards the end of its downward stroke to position 286', the crank lever 286 actuates a micro-switch 295. This occurs through the abutting screw 296 extending from lever 286 impinging upon pin 297 of the electrical switch 295. Micro-switch 295 is mounted from a bracket 298 extending from the framework 299 of the machine. The control leads 300 of switch 295 are preferably arranged to close the circuit of the operating clutch in apparatus 255 and simultaneously de-energize the brake therein, to effect the driving of the main gear 210 from the flywheel 250, as described in connection with FIGURE 6, and cause the knife mechanism 105 to be operated. Thus, provision is made that the knife mechanism 115, 116 cannot be operated until the plunger 262 (corresponding to the usual safety pin) is removed from its abutting position shown in FIGURE 7.

Summarizing, actuation of plunger 291 by the energization of solenoid 288 effects a turning of crank lever 286, to in turn operate crank shaft 266 to remove the latch 275 from effectively impeding the dashpot 261, permitting the plunger 262 to avoid abutting the lug 265 on the main drive gear 210 upon the instituting of a cutting cycle. The main drive gear 210 is rotated through the gear box mechanism at 185 by permitting the energization of the clutch in apparatus 255 to drive the drive gear 245 when the micro-switch 295 is "closed" by the crank lever 286. It is to be understood that the micro-switch 295 acts rather as a relay to "permit" current already otherwise directed to the clutch and brake for the operation herein stated to be operative. The actual control signal and supply of energization current to the clutch and brake for the purposes described is under the control of the master start-stop programming mechanism, referred to hereinabove, and also by the control switch 305 to be described in connection with FIGURE 8.

The relay switch 295 is actually in the nature of a safety device since it will prevent the knife mechanism 105 from operating by preventing the current from actually entering to energize the clutch and to de-energize the brake in apparatus 255 unless the crank lever 286 is in its lower distended (dotted) position 286' (FIGURE 9), wherein the abutting latch 275 is moved to permit the lug 265 on main gear 210 to pass dashpot 261. A spring 301 extends from frame bracket 298 and abuts the bottom portion of crank lever 286, biasing lever 286 normally against the plunger 290 of solenoid 288. Thus, when the signal to solenoid 288 is removed, spring 301 presses the crank lever 286 back to its original position shown in solid lines in FIGURE 9, and the plunger 290 of solenoid 288 is similarly returned.

The positive return of lever 286 motivates the crank shaft 266 in the direction opposite to the dotted arrow *e* in FIGURE 9 and correspondingly opposite to the motivating direction of dotted arrow *d* of FIGURE 7. This serves to reset the mechanism 260 to the original position shown in solid lines in FIGURE 7, wherein the latch 275 is in the position whereby its cam tip 276 will abut the dashpot 261, and plunger 262 will prevent the main gear 210 from continuing its rotation once the lug 265 engages plunger 262. As hereinabove stated, should the spring 301 or the intermediate linkages fail to return latch 275 to its normal position (as seen in FIGURE 7), the roller 285 on gear 210 will perform this function by displacing armature 281 back to its normal position and carry the crank shaft 266 with it.

FIGURE 8 illustrates a further electrical switch 305, having leads 306 that are placed in circuit with the clutch and brake coils of apparatus 255 incorporating the drive for the gear box 105. The switch 305, when actuated in the manner to be described, is arranged to de-energize the clutch and re-engage the brake, in the drive apparatus 255. This is accomplished when the main drive gear 210 has executed a little more than half of its revolution and thus the driving actuation on the main shaft 245 through apparatus 255 is initiated to a stop. FIGURE 8 shows one means of accomplishing the cycling of such stopping of the drive from apparatus 255 to the main shaft 245. A lever 307 extends from switch 305 and is pivoted at 308 in the switch. An abutment end 310 is provided at the end of switch lever 307 and is arranged in the path of gear 210 to abut the crank arm 212 in its cycle.

The position of switch abutment member 310 is such that the lever 307 will be moved downward in the direction of arrow $f$ when the crank arm 212 abuts member 310 as it executes its clockwise rotation (shown by arrow $g$). The position of the switch 305 is such that it is "engaged" through such abutment when the main gear 210 is rotated approximately one-half of a revolution in its 360° cycle. The operation of the switch 305 directly, or as a relay, in the circuits aforesaid for the clutch and brake, and with the main programming start-stop mechanism, is in accordance with standard practice and will be understood by those skilled in the art. The features and accomplishments of the described system and arrangements afford the novel advantages set forth herein.

KNIFE DRIVE APPARATUS

FIGURE 10 is a cross-sectional view through the knife drive apparatus 255 associated with main drive shaft 245 and flywheel 250. Reference is made to FIGURE 6 for the relationship of the drive apparatus 255 to gear box 185, including intermediate shaft 237 and main drive gear 210. The flywheel 250 is continually motivated by V-belts 310 coacting with the pulley hub 251 of flywheel 250. It is to be understood that the V-belts 310 are driven from a prime drive, such as an electric motor (not shown), when the main machine is in connection for operation.

During connection for operation of the cutting machine, the flywheel 250 is in continuous rotation, freely about the main drive shaft 245, about anti-friction bearings 311, 311. Rotation of main drive shaft 245, for th purpose of actuating the knife assembly 105, through the mechanism within gear box 185 is accomplished by the drive apparatus 255 between the hub face 312 of flywheel 250 and the extension of shaft 245 as will now be described.

Drive apparatus 255 essentially comprises an overload mechanism 315 adjacent hub face 312 of flyweel 250, an electromagnetic clucth 316 between overload mechanism 315 and drive shaft 245, and an electromagnetic brake 317. The overload mechanism 315 is described in detail hereinafter in connection with FIGURES 11 and 12 thereof. The function of overload mechanism 315 is to effect a direct drive between flywheel 250 and clutch 316 but to interrupt the energization of clutch 316 and brake 317 when for any reason a mechanical overload condition occurs in the driven knife system.

Thus, should the knife assembly 105 become impeded in its operation, actuation thereof through clutch brake 316, 317 to main drive shaft 245 will automatically cease. Clutch-brake 316, 317 may be of any suitable type such as a "Warner" clutch-brake system wherein the electromagnetic windings of both the clutch and brake are arranged to be stationary. Cross-sectional FIGURE 10 corresponds to such a clutch-brake. The clutch coil 320 of clutch 316 is stationary and secured to stationary structural member 321. Coil 320 is energized by suitable electrical means through leads 322 at the proper cyclic relationship to knife cutting.

Energization of clutch coil 320 causes rotating field member 323 to be magnetically activated. Rotating field member 323 is secured to overload mechanism 315 through projecting hub 324 of field member 323 and screws 325 to the hub 326 of the overload mechanism 315. Since overload mechanism 315 rotates with flywheel 250, it will be understood that field member 323 is carried into rotation about shaft 245 by flywheel 250. Armature plate 327 of clutch 316 is attracted into full frictional engagement with the magnetized rotating field member 323, upon energization of the clutch coil 320. Armature 327 is, in turn, secured to drive shaft 245 as is shown in detail and described in connection with FIGURE 13. Armature plate 327 is secured to splined hub 330 through projecting lugs 328 and suitable screws 329.

FIGURE 13 is a sectional view through the connection of clutch armature 327 to main drive shaft 245, taken along the line 13—13 in FIGURE 10 as viewed in the direction of the arrows (to the right). Splined hub 330 is in mesh with a splined sleeve 331 that in turn is keyed to drive shaft 245 by a key 332. Drive shaft 245 accordingly rotates at the same speed and in the same direction as flywheel 250 whenever clutch coil 320 is energized. During such clutch energization, under normal load conditions, the flywheel 250 directly motivates rotating field member 323 through overload mechanism 315 and armature ring 327 is attracted into frictional engagement with rotating member 323 to, in turn, directly drive the main drive shaft 245 through the splined hub 330–sleeve 331 connection thereto.

During normal de-energization of clutch 316, the electromagnetic brake 317 is also de-energized. Brake 317 has a stationary field coil 335 connected to the electrical circuit through leads 334. The stationary field coil 335 is secured to stationary machine member 336. Included in field ring 333 are a number of powerful Alnico magnets (not shown). These permanent magnets create a field through the stationary magnetic member 337 of brake 317. This field attracts rotatable brake armature plate 338 in frictional engagement therewith, as is understood by those skilled in the art.

The brake armature 338 is secured to the main drive shaft 245 through lugs 339 on splined hub 330, and suitable fastening means as screws 340. Thus, whenever clutch coil 320 is de-energized, the brake coil 335 is likewise de-energized and brake armature ring 338 is kept attracted against stationary brake field member 337 through the permanent Alnico magnets. The main drive shaft 245 is thus held against rotational displacement by brake 317. The knife assembly 105 and the gear box 185 are stationary while the coil brake 316, 317 remains de-energized as will now be understood.

However, upon the requirement for the knife assembly 105 to be actuated, the main drive shaft 245 is rotationally activated as follows: The clutch coil 320 and the brake coil 335 are simultaneously energized through their respective leads 322 and 334. Clutch armature 327 thereupon becomes frictionally engaged with rotating field member 323 of clutch 316, and drive shaft 245 becomes directly coupled with flywheel 250, through overload mechanism 315. Energization of brake field coil 335 creates a magnetic field that counteracts the magnetic field normally set up by the Alnico magnets therein. The brake armature 338 is thereupon instantly released from engagement with stationary brake field member 337. The drive shaft 245 is thus rotated by the simultaneous engagement of clutch 316 and release of brake 317. Shaft 245 is rotated by the flywheel 250 at the same speed and direction as the flywheel.

When it is desired to stop drive shaft 245, the electrical energy to the clutch-brake 316, 317 is interrupted (at leads 322, 334). When the current is interrupted to brake field coil 335, the Alnico magnet magnetic force draws the brake armature plate 338 into frictional contact with the brake stator plate 337. Since the brake stator plate 337 is secured to stationary structural member 336, the drive shaft 245 will thereupon come to an immediate stop. At the same instant that the Alnico brake field is de-energized, the clutch coil 320 is also de-energized. The clutch armature plate 327 is thereupon released from rotating field member 323. The flywheel 250 is thus freed to rotate, having no effect upon the rotation of drive shaft 245.

In summation, whenever it is required to activate the knife assembly 105 into a cutting stroke, the electrical circuit is arranged to simultaneously energize the clutch coil 320 and brake coil 335 through their respective loads 322 and 324. Activation of clutch brake 316, 317 thereupon effects a direct mechanical connection between the flywheel 250 and the drive shaft 245 through the intermediary overload mechanism 315. The drive shaft 245 is practically instantly activated into rotation. De-energization of the clutch coil 320 and brake coil 335 likewise instantly disconnects the flywheel 250 drive to the shaft 245, the brake 317 causing practically instant stoppage of drive shaft 245. The energization and de-energization cycling of the clutch brake 316, 317 is associated with the requirements of the cutting assembly 105 and instituted by the master start-stop program system.

Reference is now made to FIGURES 10 to 12 for the description of the operation of overload mechanism 315. The overload mechanism 315 comprises a hub 326 that rotates freely about drive shaft 245, on anti-friction bearings 345, 345. Two plates 350, 350 are firmly accured to hub 326. A plate 351 is in turn secured to each plate 350 by screws 352. In FIGURE 11 only the upper of two similar overload devices is shown. It is to be understood that one of such devices may be incorporated or two opposite ones for balanced safety, as desired.

The drive from flywheel 250 is transmitted to plates 351 of the overload mechanism 315, through the lugs 355, 355 extending from the hub face 312 of flywheel 250, through springs 356. Spring 356 extends between lug 355 and plate 351, about positioning screw 353. Positioning screw 353 operates into threaded member 354. Spring 356 is designed and pre-set to transmit a given amount of torque between lug 355 and plate 351 without deflecting. When an excess amount of torque is reached, spring 356 will deflect in a manner to be moved into dotted position 356'. Such deflection of spring 356 causes a change in the angular relation between hub 326 (and its attached parts) with respect to flywheel 250 (and its lugs 355).

A bracket 357 is secured to plate 350 on hub 326 by screws 358. In this manner, an angular displacement of hub 326 with respect to flywheel 250 likewise displaces bracket 357. The purpose of bracket 357 is to actuate a suitable electrical switch 360 to immediately disconnect clutch-brake 316, 317 as soon as such angular displacement occurs. An angular displacement occurs when the driving torque between lug 355 and plate 351 exceeds a reasonable amount of overload in a normal drive cycle under all conditions of operation, as well as exceeds the usual overload due to shock in the operation of the knife assembly. Beyond such point, spring 356 compresses, and the relative motion between the input and output ends of the overload mechanism 315 operates such switch 360, herein termed an overload switch.

Reference is made to FIGURE 12 for a schematic overload switch 360, connected to loads 359. The relation of overload switch 360 and the associated linkages in overload mechanism 315 operable by an angular displacement due to overload is shown in FIGURE 12. Bracket 357 secured to plate 350 and hub 326 is seen in elevation at the line 12—12 of FIGURE 11, in the direction of the arrows. A triangular lever 361 is pivoted at 362 in the end of a pivot stud 363 set into flywheel 250. Lever 361 is also guided in a slot in stud 364 in flywheel 250. The tip of lever 361 normally rests against the head of screw 365 set in bracket 357 by lock nut 366.

An actuating rod 367 is slideably mounted within a bore 368 of flywheel 250. A counter-balancing spring 369 maintains rod 367 into a biased position (to the left in FIGURE 12) against a collar 370 pinned to rod 367. The head of rod 367 coacts with the abutting top of lever 361. It will now be seen that upon a relative angular displacement of flywheel 250 and hub 326 of overload mechanism 315 (through the deflection of spring 356 to position 356', FIGURE 11), bracket 357 secured to hub 326 moves in the counterclockwise direction (in FIGURE 11), and upwards in FIGURE 12.

Such upward movement of bracket 357 carries screw 365 upwards, to tilt triangular lever 361 on its pivot 362. The head of rod 367 is thereupon moved inwards of flywheel 250 (to the right in FIGURE 12). The rod 367 accordingly is projected so that its tip 367' (shown in dotted lines) is moved outside of the rotating flywheel 250. Suitable means are provided whereby the rod tip 367' abut a member 371 of overload switch 360 to actuate the switch 360. Member 371 may be one that pivots to operate switch 360 when abutted by rod tip 367'. Other equivalent means for actuating switch 360 by rod 367 may be used.

Overload switch 360 is, of course, mounted on stationary portion of the machine and when abutted by projecting rod 367 of overload mechanism 315 serves to actuate a remote electrical circuit as required for the hereinstated purpose. Overload switch 360 may operate such circuit directly, through electron tubes, or through a relay. Its function is, when actuated by rod tip 367', to immediately cut off any current flowing to clutch coil 320 and brake coil 335. In other words, upon a mechanical overload displacement at mechanism 315, overload relay 360 is actuated to immediately de-energize clutch-brake 316, 317 whereupon the drive shaft 245 to knife assembly 105 is promptly stopped. The lock-out relay (not shown) actuated by overload switch 360 remains in circuit, maintaining clutch-brake 316, 317 de-energized until the cause of the overload is removed, whereupon such relay is reset manually.

In the foregoing, I have described my invention only in connection with preferred embodiments thereof. Many variations and modifications of the principles of my invention within the scope of the description herein are obvious. Accordingly, I prefer to be bound not by the specific disclosure herein but only by the appending claims.

I claim:

1. A knife assembly for a cutting machine comprising a knife body supported on the cutting machine, a drive member connected to said knife body, and a spring having one end coupled to said knife body for normally biasing the knife body to its non-operating position and being of sufficient strength to lift said knife body to inactive position independently of said drive member, further including mechanism for operating said drive member including a drive shaft, a brake therefor, and means including an overrunning clutch between said drive member and said drive shaft whereby said drive shaft may be braked to stop and said knife body be reset to its non-operating position independently of said drive shaft.

2. A reciprocable knife assembly for a cutting machine operable on a stack of sheets comprising a knife bar supported in guides on the machine for carrying a blade, a reciprocable drive member coupled to said knife bar for establishing a cutting stroke on downward knife bar actuation, said knife bar being pivotally supported in the machine, and a spring having one end linked to said knife bar for normally biasing the knife bar upwardly to its non-operating position, said spring being of sufficient strength to lift said knife bar to inactive position independently of said drive member, further including mechanism for operating said drive member including a drive shaft, brake therefor, and a overrunning clutch between said drive member and said drive shaft, said spring being proportioned to motivate said knife bar more rapidly than does said drive shaft as said drive member passes dead center in its reciprocable drive cycle, and means whereby said drive shaft may be braked to stop once said drive member passes dead center and means whereby said knife bar is reset to its non-operating position independently of the drive shaft.

3. A knife assembly as claimed in claim 1, further including means for normally latching said knife body in its non-operating position.

4. A reciprocable knife assembly for a cutting machine operable on a stack of sheets comprising a knife bar supported in guides on the machine for carrying a blade, a reciprocable drive member coupled to said knife bar establishing a cutting stroke on downward knife bar actuation, said knife bar being pivotally supported in the machine; mechanism for operating said drive member including a drive shaft, a flywheel, and an overrunning clutch between said drive shaft and said flywheel; and overload means for disconnecting said flywheel from said drive shaft through said clutch upon a mechanical overload condition at the driven knife bar and is associated drive member further including means for latching said knife bar in its non-operating position upon disconnection of said drive shaft by said overload means, including a spring connected to said knife bar and of sufficient strength to motivate said knife bar to said non-operating position upon said disconnection, independently of said drive shaft, and a brake means operative to stop said drive shaft.

References Cited by the Examiner
UNITED STATES PATENTS

| | | | |
|---|---|---|---|
| 1,567,078 | 12/1925 | Pennington | 83—589 |
| 1,716,414 | 6/1929 | Beyer | 83—590 X |
| 1,885,438 | 11/1932 | Hazelton | 83—588 |
| 2,221,877 | 11/1940 | Meyer | 83—526 |
| 2,225,565 | 12/1940 | McCann | 192—149 |
| 2,350,975 | 6/1944 | Rodder et al. | 192—149 |
| 2,491,363 | 12/1949 | Dehn | 83—526 |
| 2,512,738 | 6/1950 | Dixon et al. | 292—149 |
| 2,570,873 | 10/1951 | Seybold | 83—543 |
| 2,947,394 | 8/1960 | Grover. | |

WILLIAM W. DYER, Jr., *Primary Examiner.*

HUNTER C. BOURNE, Jr., J. SPENCER OVERHOLSER, ANDREW R. JUHASZ, *Examiners.*